Oct. 20, 1970
S. MINKOWITZ
3,535,525
APPARATUS FOR SENSING THE CENTROID OF AN IMPINGING LASER LIGHT BEAM
Filed Jan. 31, 1967
2 Sheets-Sheet 1
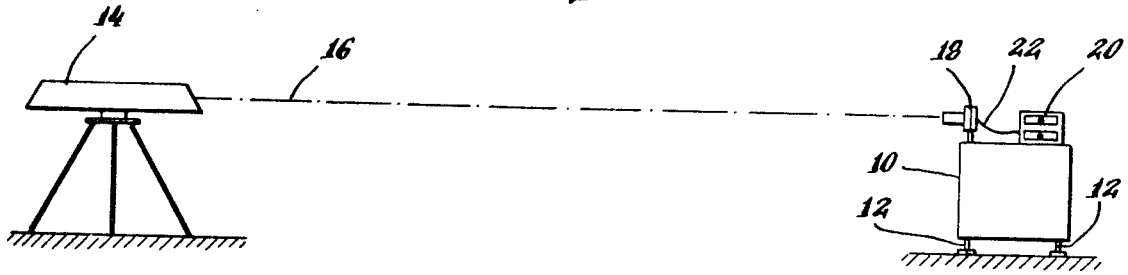
Fig. 1.
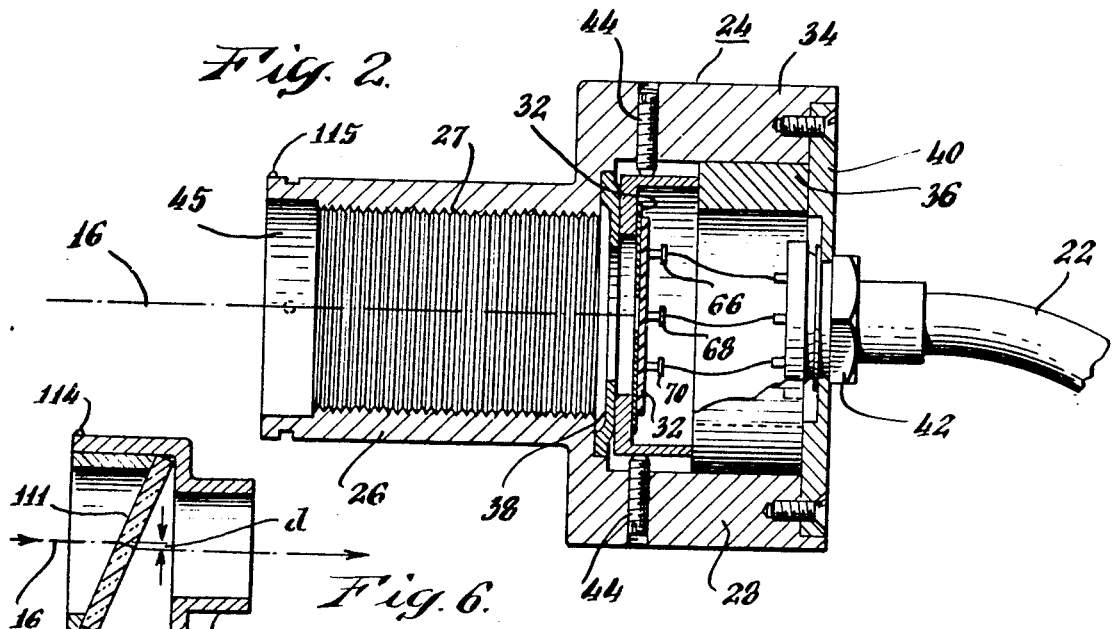
Fig. 2.
Fig. 6.
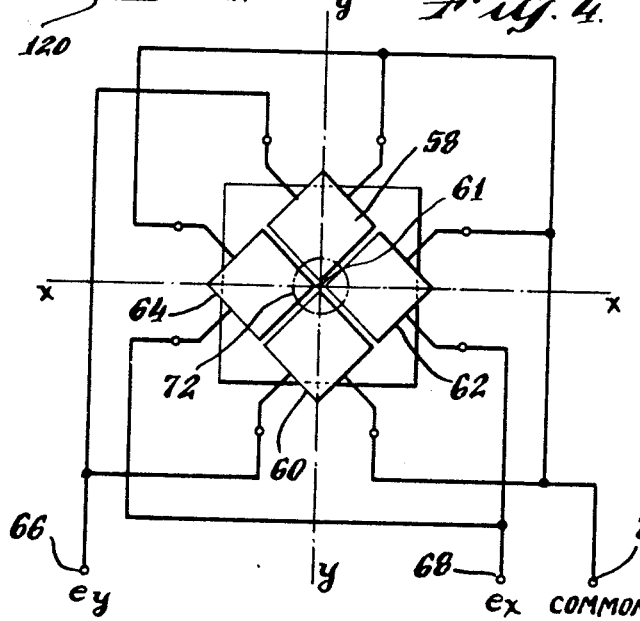
Fig. 4.
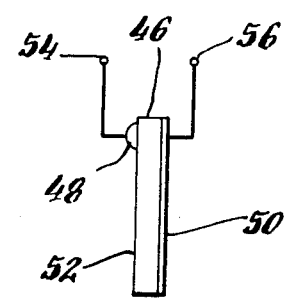
Fig. 3.
INVENTOR.
Sheldon Minkowitz
BY
Frank J. Thompson
ATTORNEY.

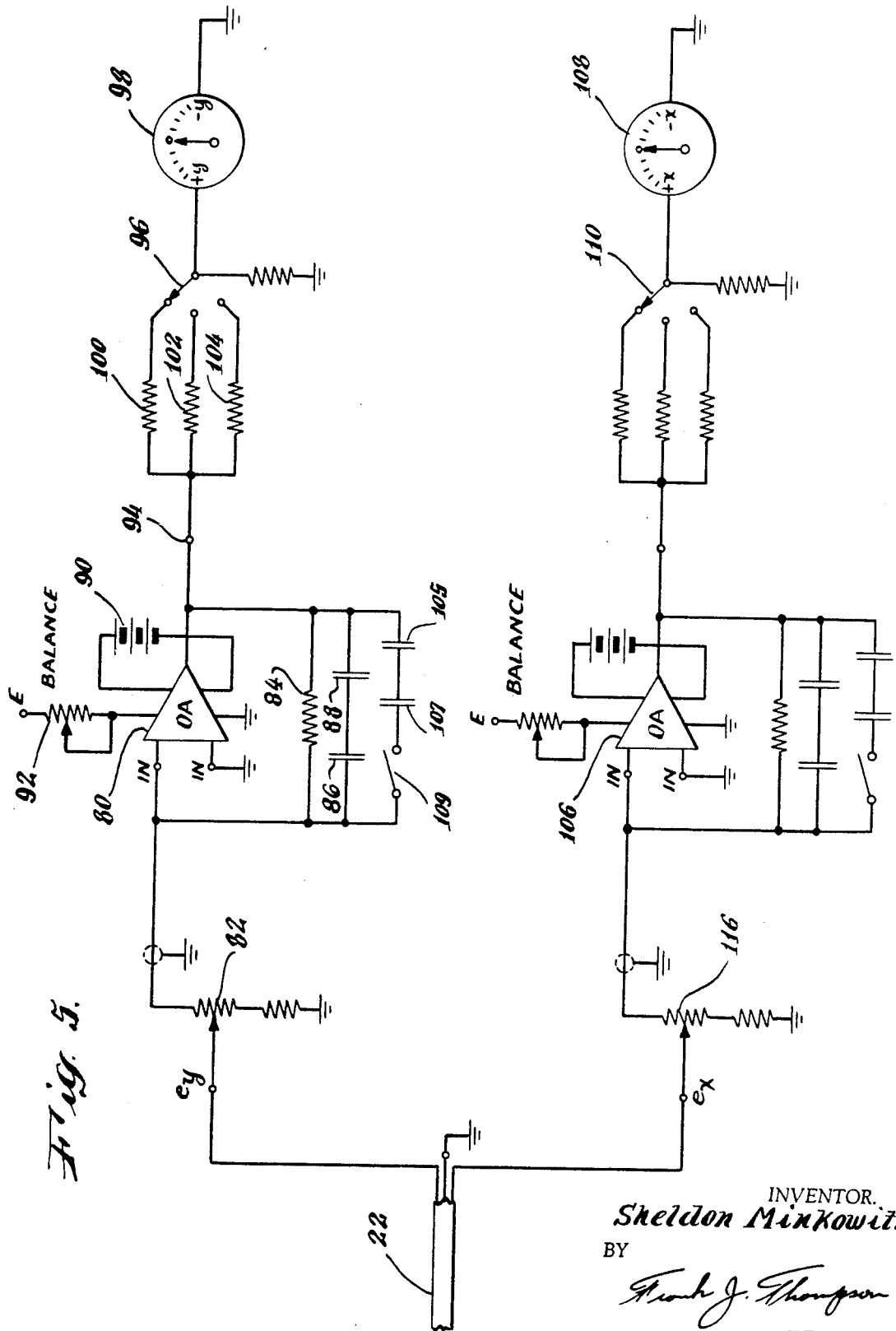

United States Patent Office 3,535,525
Patented Oct. 20, 1970

3,535,525
APPARATUS FOR SENSING THE CENTROID OF AN IMPINGING LASER LIGHT BEAM
Sheldon Minkowitz, Westport, Conn., assignor to The Perkin-Elmer Corporation, Norwalk, Conn., a corporation of New York
Filed Jan. 31, 1967, Ser. No. 612,969
Int. Cl. G01c 5/00; G01j 1/20
U.S. Cl. 250—208     8 Claims

ABSTRACT OF THE DISCLOSURE

An alignment apparatus for aligning an object with respect to a reference laser light beam includes a planar array of photosensitive cells intercoupled in a manner for generating a first voltage having a polarity and magnitude indicative of the displacement of the object along an axis perpendicular to the impinging light beam and a second voltage having a polarity and a magnitude indicative of the displacement of the object along a second coplanar axis. Calibration means are provided and are adapted for deflecting the impinging light beam a predetermined distance from the optical axis of the planar array in order for calibrating the apparatus.

---

This invention relates to apparatus for aligning a body with respect to a reference plane or line or measuring its deviation therefrom. The invention relates more particularly to apparatus for accomplishing the alignment with a relatively high degree of accuracy.

In various applications such as tooling operations and in accurate surface layouts, it is necessary to align a body to a high degree of precision with respect to some reference plane or line. The development of the laser has made possible the projection of an intense narrow beam of light which propagates in rectilinear fashion over relatively large distances and is accompanied by insignificant divergence. This feature of the laser has recommended its use in set-up and alignment applications.

At times it is desirable to align a number of remotely spaced bodies on a line represented by the reference laser beam. The body is moved in a direction in the plane perpendicular to the propagation until the centroid of the impinging laser beam is centered on a reference point on the body. Various operations require an alignment of the reference point with respect to the beam to an accuracy of a few ten thousandths of an inch. Such an operation can be tedious and time consuming in that a multitude of adjustments are required in accomplishing the alignment with this degree of accuracy. Although various arrangements have heretofore been employed during the alignment procedure for indicating displacement of the beam from the reference point, these arrangements are relatively complex and costly.

Accordingly, it is an object of the present invention to provide an improved apparatus for use with a laser light source for indicating displacement of the body from a centroid of the laser light beam.

Another object of the invention is to provide apparatus of the type referred to which is relatively less complex and less costly than prior arrangements.

The accuracy with which an alignment can be accomplished is dependent to a large extent on ambient conditions. For example, alignment with an order of accuracy of several ten thousands of an inch must take into consideration such factors as air noise (turbulence) and ambient lighting conditions. Prior apparatus have failed to take these factors into account.

A further object of the invention is the provision of an alignment apparatus of the type referred to having relatively non-complex and inexpensive means for compensating for environmental conditions.

In accordance with a feature of the present invention, an alignment apparatus includes a housing supporting a plurality of conductively insulated photocells positioned in a planar array about a reference point and adapted to be disposed in the path of a reference laser light beam. Output terminals of the cells are intercoupled in a manner for providing first and second output voltages each having a polarity and amplitude indicative of the direction and magnitude respectively of the displacement of a centroid of the beam from the reference point along mutually perpendicular coplanar axes. Means couple these voltages to remotely positioned amplifier and indicating means for indicating the direction and magnitude of the displacement along the mutually perpendicular axes.

In accordance with another feature of the invention, means are provided for reducing the effect of air noise upon the indicating means. An electrical damping capacitance is coupled across a feedback network of the amplifying means for reducing sensitivity thereof to environmental effects. In addition, the cell array housing includes an elongated tubular member extending in a direction parallel to the light beam and arranged for surrounding the beam for a portion of its transversal while inhibiting reflections of ambient lighting.

These and other objects and features of the invention will become apparent with reference to the following specifications and drawings wherein:

FIG. 1 is a diagram illustrating in general the arrangement of a laser alignment apparatus incorporating an embodiment of the present invention;

FIG. 2 is a cross-sectional view of a photocell-array housing utilized with the apparatus of FIG. 1;

FIG. 3 is a side view of a typical photocell utilized in the cell array;

FIG. 4 is a diagram illustrating the spatial relationship of the array of photocells utilized in the present invention as viewed from a laser beam input aperture of the housing of FIG. 2;

FIG. 5 is a circuit diagram, partially in block form, illustrating one embodiment of the amplifying and indicating means utilized in the present invention; and FIG. 6 is a diagram of an apparatus adapted for calibrating the laser alignment apparatus.

In FIG. 1, a body 10 which is to be aligned is supported on leveling screws 12 at a position remote from a laser light source 14. The body 10 may comprise a machine tool or work piece or other body which is to be aligned with a high degree of accuracy. A beam 16, generated by the laser light source, represents a reference line for the alignment of the remotely positioned body 10. The laser light source is a gaseous type, such as a helium-neon laser and beam 16 has a relatively thin cross section. The leveling screws 12 or other similar leveling means or alignment means are adjusted in order to bring a reference point at the body 10 in alignment with the beam 16. As indicated in greater detail hereinafter, the reference point will be represented by the intersection of mutually perpendicular axes in a planar photocell array.

In facilitating the alignment, and in accordance with features of the invention, an alignment apparatus comprising a housing 18 supporting a planar array of photocells in a plane generally perpendicular to the direction of propagation of the beam 16 is provided, along with an amplifying and indicating means 20. In its general aspects, first and second output voltages representative of the displacement between the beam 16 and the reference point are generated by the planar photocell array and are coupled to the amplifying and indicating means 20 via a flexible cable 22. The direction and magnitude of the displacement along one planar axis is respectively indicated by the polarity and amplitude of the first voltage while the direction and magnitude along a second perpendicular coplanar axis is indicated respectively by the polarity and amplitude of the second voltage.

The housing 18 is shown in greater detail in FIG. 2. A generally cylindrical housing member 24 includes an integral elongated shade portion 26 which shades ambient light, and an integral housing section 28 for supporting the array of photocells along with mounting and connector means. The elongated shade portion 26 extends in the direction of the impinging laser beam and an inner surface thereof is made irregular by forming a thread therein to provide a surface which reduces reflections of ambient light which might enter the neck portion. The array of photocells is represented by the disc 32 which is mounted on a disc 30. This assembly is secured to a support member 34 in any suitable manner, such as by a nonconductive adhesive. The support member 34 is supported axially between a spacer member 36 and a spring washer 38. An end cap 40 upon which is secured a connector 42 abuts the spacer 36 and secures the entire assembly within the housing member 24. The position of the photocell array support member 34 can be adjusted in a vertical direction as viewed in FIG. 2 by adjusting set screws 44. Additional set screws are provided for adjustment in a mutually perpendicular coplanar direction. The adjustments are normally manufacturing adjustments to align the optical axis with the mounting diameter of the housing 24. Alterations in the position of the body 10 will cause a corresponding movement of the housing member 24 and the position of the impingement of the beam 16 upon the disc 30 will be varied. These alternations are continued until the indicating means, discussed hereinafter, indicates that the desired degree of alignment has been attained.

In order that the body alignment may be controlled to a high degree of accuracy, a plurality of photocells is arranged in a rectangular array as illustrated in FIG. 4 and intercoupled for generating voltages indicative of the direction and magnitude of beam displacement from a reference point. FIG. 4 is an enlarged view of the photocell array of FIG. 2 as viewed from an inlet aperture 45 of the shade portion 26. Each photocell is of a well known type and comprises a generally planar and rectangular silicon solar cell, a typical example being the commerically available Hoffman #110. FIG. 3 is a side view of one cell of the array and is shown to include a semiconducting element 46 and electrodes 48 and 50. As is well known, when light impinges upon a surface 52 of the semiconductor material, a voltage of relatively positive polarity will be provided at one terminal 54 while a voltage of relatively opposite polarity will be provided at another terminal 56. In FIG. 4 each of the cells is shown arranged diagonally along an associated axis. For example, the cells 58 and 60 are positioned diagonally along the Y axis about a reference point 61 while the cells 62 and 64 are positioned diagonally along the X axis. The intersection of these axes at the reference point 61 represents the reference point for the apparatus. When the body 10 is properly aligned, the centroid of the light beam 16 will be centered on the reference point. The output terminals of the cells are arranged for providing first and second output voltages at output terminals 66 and 68 with respect to a common output terminal 70. The positive terminal of cell 58 and the negative terminal of cell 60 are coupled together and to terminal 66 while the positive terminal of cell 64 and the negative terminal of cell 62 are coupled together and to terminal 68. The remaining cell terminals are coupled together and to terminal 70.

In operation, as the centroid of beam 16 impinges upon the intersection of the X and Y axes and reference point 61, each cell provides an equal output and a potential of zero volts with respect to the terminal 70 and will appear at terminals 66 and 68. The dotted circle 72 in FIG. 4 indicates a reference laser beam having its centroid perfectly centered on the reference point of the photocell array. As the beam and reference point are displaced in a positive Y direction, for example, the light energy falling on cell 58 increases while that falling on cell 60 decreases. The voltage at terminal 66 will become positive and will have a magnitude corresponding to the magnitude of the displacement in the positive Y direction. Similarly, when the beam is displaced from the intersection of the axes along the positive X axis, a positive potential will exist at the terminal 68 with respect to terminal 70 and will have a magnitude corresponding to the amount of displacement. Various combinations of voltages can thus exist at terminals 66 and 68 as the centroid of the beam 16, represented by the circle 72, falls on differing positions on the photocell array.

The voltages at terminals 66, 68, and 70 are coupled, via the connector 42 of FIG. 2 and the cable 22, to separate channels of the amplifying and indicating means 20. The circuit arrangement of the amplifying and indicating means is shown in detail in FIG. 5. Each of the voltages of terminals 66 and 68 is applied to an operational amplifier. The voltage $e_y$ is applied to an operational amplifier 80 in a first channel via a level adjusting potentiometer 82. The operational amplifier includes conventional feedback arrangement shown to include the resistor 84 and capacitors 86 and 88. Operating voltages are applied to the amplifier from a source of potential 90, and, a potentiometer 92 is provided as an amplifier balancing means. Operational amplifiers of this type are well known and are shown and described in detail as, for example, in the publication "Electronic World," volume 70, Nos. 1 and 2, July and August, 1963. The output of the operational amplifier appears at terminal 94 and is coupled via switching means 96 to a meter 98. The meter 98 is of the center reading type and is deflected in one direction from its center position to indicate displacement of the beam in a positive Y direction when a voltage of predetermined polarity appears at terminal 94 and in an opposite direction when a voltage of opposite polarity appears at terminal 94 to indicate displacement of the beam in a negative Y direction. The magnitude of the meter displacement will be proportional to the distance the centroid of the beam is displaced in the Y direction from the reference point 61. A plurality of resistors including the resistors 100, 102 and 104 are provided for sensitivity adjustments. Capacitors 105 and 107 are provided and are coupled in parallel with the feedback network by a switch 109. These capacitors alter the feedback time constant and reduce the effect of ambient noise. A similar channel having an operational amplifier 106 and indicating meter means 108 for indicating the displacement of the beam in the X direction is also illustrated.

In operation, the body 10 of FIG. 1 is coarsely aligned by positioning the body 10 to provide impingement of the beam on the array. The switching means 96 and 110 is adjusted to incorporate higher value impedances of the associated resistors. As the levers 12 are adjusted and the magnitude of displacement between the beam centroid and reference point is decreased, the switching means is operated to increase the sensitivity of the meter 98.

FIG. 6 illustrates a calibration means for calibrating the apparatus. This means comprises a tubular member 120 having a plane parallel glass plate 111 supported at an angle within its length. The segment 112 of reduced diameter is adapted to be inserted into the aperture 45 (FIG. 2). An indicating mark 114 is aligned with a corresponding indicating mark 115 on the member 26. The light beam 16 is caused to deviate a predetermined distance $d$ from the optical axis by the presence of the glass plate. Calibration of the meters 98 and 108 for this predetermined deviation is thus accomplished by adjusting the level resetting potentiometers 82 and 116. The member 120 may be rotated in the aperture 45 to provide alignment in additional planes.

Thus, a relatively noncomplex and inexpensive arrangement has been described for providing an indication of displacement of the centroid of a reference laser beam from a reference point on a body being aligned. The arrangement is particularly advantageous in that two voltages having polarities and magnitudes representative of the direction and magnitude of displacement are provided thereby simplifying the required amplifying and indicating means. In addition, damping means comprising capacitors eliminate to a great extent the adverse effects resulting from scintillation and air noise. In addition, the housing member for the planar array has an elongated portion with an inner surface adapted for minimizing reflections of ambient light which enters the housing.

While I have illustrated and described a particular embodiment of my invention, it will be understood that various modifications may be made therein without departing from the spirit of the invention and the scope of the appended claims.

I claim:

1. An alignment apparatus for spatially aligning a body with respect to an impinging reference laser light beam comprising:

first, second, third and fourth electrically insulated silicon photocells;

said photocells having a generally plane and rectangular configuration;

means for supporting said first and second photocells diagonally along a first axis, said axis having a reference point intermediate said first and second cells, and, for supporting said third and fourth cells diagonally along a second axis perpendicular to said first axis, said third and fourth cells spaced about a reference point which intersects the reference point of said first axis;

said photocells each having a pair of output terminals for providing relatively positive and negative electrical potentials therebetween when light impinges upon said cell;

means providing a connection between a relatively positive and a relatively negative terminal of said first and second photocells respectively for providing a first output voltage;

means providing a connection between a relatively negative and a relatively positive terminal of said third and fourth photocells for providing a second output voltage;

means providing a connection beteen the remaining terminals for providing a reference voltage;

housing means for supporting said photocell array on a body to be aligned in the path of an impinging laser light beam;

indicating means including first and second channels having an amplifying device and a center reading meter in each channel;

a common input terminal for said channels and a signal input terminal for each of said channels;

means for coupling said first output voltage to the input terminal of said first channel, for coupling the second output voltage to the input terminal of said second channel, and for coupling the reference potential to said common input terminal; and a calibration means comprising a second housing adapted for mating with said solar cell housing and supporting a planar glass member which is positioned at an angle with respect to an axis of said housing and adapted for displacing the impinging laser light beam from an optical axis of the apparatus by a predetermined distance.

2. An alignment apparatus for spatially aligning a body with respect to an impinging reference laser light beam comprising:

a plurality of generally planar shaped conductively-insulated photocells positioned in closed spatial relationship in a planar array about a reference point on a planar cell support body;

a housing means for supporting said array in preset alignment on a body to be aligned in the path of a laser light beam which directly impinges upon said array;

said photocells comprising rectangular bodies and first and second photocell bodies are positioned diagonally along one axis and third and fourth photocell bodies are positioned diagonally along another axis;

said photocells each having a pair of output terminals for providing relatively positive and negative electrical potentials therebetween when light impinges thereupon;

means intercoupling said terminals in a manner for providing first and second output voltages each having a polarity and amplitude respectively indicative of the direction and magnitude of laser beam displacement from said reference point along mutually perpendicular coplanar axes;

an indicating means adapted for providing first and second separate and concurrent indications each representative of the polarity and amplitude of input voltages applied thereto;

means for applying said first and second output voltages to said indicating means; and means adapted for providing a predetermined displacement of the input laser beam from said reference point.

3. The apparatus of claim 2 wherein said photocells comprise silicon solar cells.

4. The apparatus of claim 2 wherein said indicating means comprises a first channel having an amplifying means and a center reading meter calibrated for linear beam displacement along the first coplanar axis, and, a second channel having amplifying means and a center reading meter calibrated for linear beam displacement along a second coplanar perpendicular axis.

5. The apparatus of claim 2 wherein said calibration means comprises a tubular member adapted to mate with said housing means and supporting a plane parallel plate disposed at an angle to the axis of said housing means.

6. The apparatus of claim 4 including capacitive ambient noise damping means coupled to said meters.

7. The apparatus of claim 6 wherein said cell housing includes an elongated shading member having an internal surface adapted for reducing reflections of ambient light.

8. The apparatus of claim 7 wherein said amplifying and indicating means are spaced apart from said array housing and said first and second voltages are coupled thereto via a flexible conductive cabing means.

References Cited

UNITED STATES PATENTS

| 2,703,505 | 3/1948 | Senn | 250—220 X |
| 2,952,779 | 9/1960 | Talley | 250—203 X |
| 3,229,099 | 1/1966 | Schwinghamer | 250—201 |
| 3,242,340 | 3/1966 | Layne | 250—208 |
| 3,252,110 | 5/1966 | Gustafson et al. | 250—234 X |
| 3,321,248 | 5/1967 | Williamson et al. | 299—1 |
| 3,370,293 | 2/1968 | Green | 250—203 X |

JAMES W. LAWRENCE, Primary Examiner

E. R. LaROCHE, Assistant Examiner

U.S. Cl. X.R.

250—203, 239; 356—172